US012627608B2

(12) United States Patent
Sun et al.

(10) Patent No.: US 12,627,608 B2
(45) Date of Patent: May 12, 2026

(54) VEHICLE COMMUNICATION METHOD, SYSTEM AND CENTRAL GATEWAY

(71) Applicants: Futaijing Precision Electronics (Yantai) Co., Ltd., Yantai (CN); HON HAI PRECISION INDUSTRY CO., LTD., New Taipei (TW)

(72) Inventors: Chih-Chieh Sun, New Taipei (TW); Chi-Sen Hsiao, New Taipei (TW); Yu-Jhen Wang, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 18/526,703

(22) Filed: Dec. 1, 2023

(65) Prior Publication Data

US 2025/0080468 A1      Mar. 6, 2025

(30) Foreign Application Priority Data

Aug. 29, 2023    (CN) .......................... 202311099744.9

(51) Int. Cl.
H04L 47/2425        (2022.01)
H04L 47/70          (2022.01)
H04L 67/12          (2022.01)

(52) U.S. Cl.
CPC ........ H04L 47/2433 (2013.01); H04L 47/826 (2013.01); H04L 67/12 (2013.01)

(58) Field of Classification Search
CPC .... H04L 47/2433; H04L 47/826; H04L 67/12
See application file for complete search history.

(56) References Cited

U.S. PATENT DOCUMENTS

2018/0237040 A1*   8/2018   Mong ..................... H04L 67/61
2024/0333802 A1*  10/2024   Mesde ................... H04L 69/08

FOREIGN PATENT DOCUMENTS

CN        115051887      *  9/2022
TW        202313384         4/2023

* cited by examiner

*Primary Examiner* — Glenton B Burgess
(74) *Attorney, Agent, or Firm* — ScienBiziP, P.C.

(57)                ABSTRACT

A method for vehicle communication applied to a central gateway of a vehicle communication system. The method comprises: receiving zone information from a source zone controller of the plurality of zone controllers based on a time-sensitive network protocol, and the zone information comprises vehicle body data of a vehicle area controlled by the source zone controller; determining information to be transmitted based on the zone information; determining a target zone controller for receiving the information to be transmitted among the plurality of zone controllers based on the zone information; sending the information to be transmitted to the target zone controller based on the time-sensitive network protocol. A vehicle communication system, a central gateway, and a non-transitory storage medium are also provided.

10 Claims, 5 Drawing Sheets

Obtaining a traffic class of the information to be transmitted   ⟋3041

Determining the traffic transmission priority matching the traffic class of the information to be transmitted in the correspondence between the pre-stored traffic class and the traffic transmission priority   ⟋3042

Sending the information to be transmitted to the target zone controller based on the matched traffic transmission priority   ⟋3043

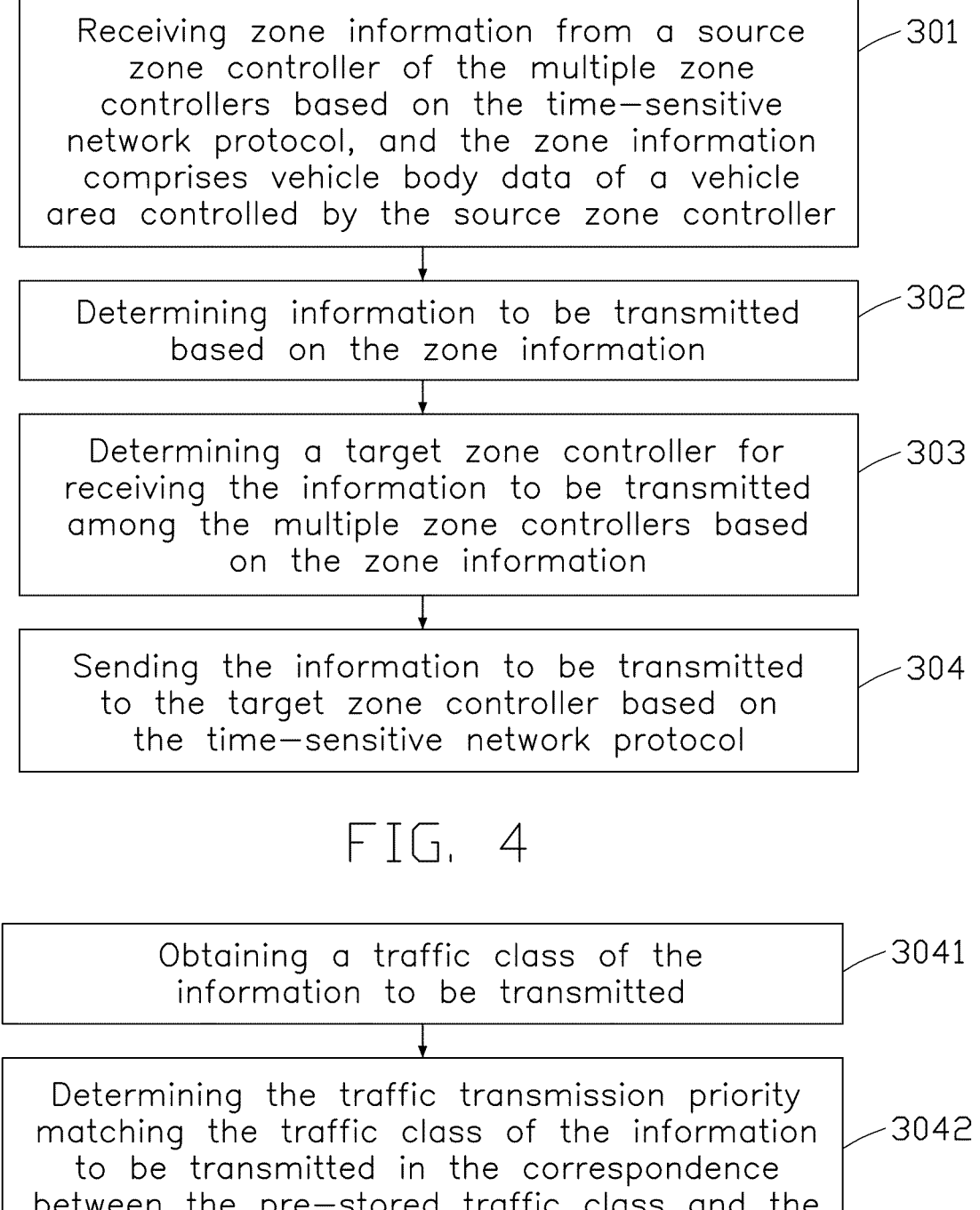

Receiving zone information from a source zone controller of the multiple zone controllers based on the time-sensitive network protocol, and the zone information comprises vehicle body data of a vehicle area controlled by the source zone controller — 301

Determining information to be transmitted based on the zone information — 302

Determining a target zone controller for receiving the information to be transmitted among the multiple zone controllers based on the zone information — 303

Sending the information to be transmitted to the target zone controller based on the time-sensitive network protocol — 304

FIG. 4

Obtaining a traffic class of the information to be transmitted — 3041

Determining the traffic transmission priority matching the traffic class of the information to be transmitted in the correspondence between the pre-stored traffic class and the traffic transmission priority — 3042

Sending the information to be transmitted to the target zone controller based on the matched traffic transmission priority — 3043

FIG. 5

VEHICLE COMMUNICATION METHOD, SYSTEM AND CENTRAL GATEWAY

FIELD

The subject matter herein generally relates to vehicle communications.

BACKGROUND

Electronic equipment such as computers, mobile phones, outdoor wireless base stations, etc., has many functions, requiring high power to meet operation needs. Therefore, a lightning strike standard of the electronic equipment is becoming higher.

A lightning protection of the electronic equipment usually comprises a lightning surge protection circuit, a rectifier, and a charging chip, which are arranged in a primary side of a transformer. Among the above mentioned components, the lightning surge protection circuit provides the main lightning protection. The common mode lightning current can flow through the rectifier, the charging chip and a capacitor to the ground wire. The common mode lightning current is related to the value of the capacitor and the lightning voltage. Most of the current rectifiers are discrete Field Effect Transistor or active bridge, which have low current resistance and can be easily pierced when encountering large lightning strikes (above 4 kV). The field effect transistor inside the charging chip also has low current resistance and can easily break by lightning.

BRIEF DESCRIPTION OF THE DRAWINGS

Implementations of the present technology will now be described, by way of example only, with reference to the attached figures.

FIG. 4 is a flowchart of a method for vehicle communication according to an embodiment of the present disclosure.

FIG. 5 is a flowchart of a method for sending information according to an embodiment of the present disclosure.

DETAILED DESCRIPTION

Figure 1:
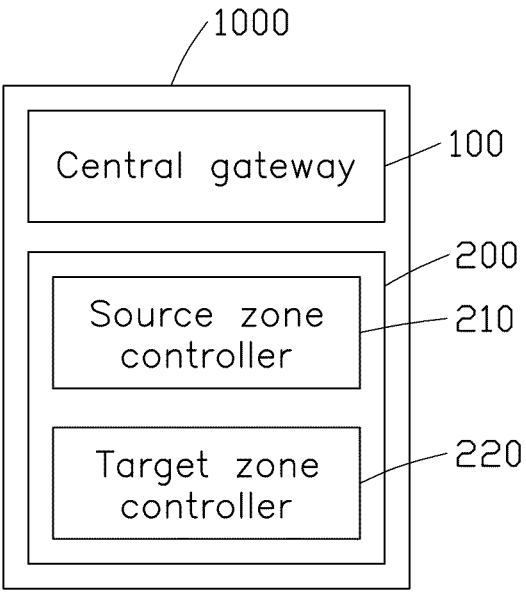
FIG. 1 is a block diagram of a vehicle communication system in one embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a scene diagram of a vehicle communication system 1000 in one embodiment of the present application. A backbone network of the vehicle communication system 1000 can be a time-sensitive network (TSN). The TSN is a protocol family that realizes the minimum time delay of certainty in non-deterministic Ethernet. The TSN is a set of protocol standards developed by the TSN working group in the IEEE802.1 working group, which defines a time-sensitive mechanism of Ethernet data transmission and adds certainty and reliability to standard Ethernet to ensure the real-time, deterministic and reliable transmission of data.

The vehicle communication system 1000 comprises a central gateway 100 and a plurality of zone controllers 200. The central gateway 100 communicates with the plurality of zone controllers 200 through the time-sensitive network. The zone controller 200 is a region-level control unit in a vehicle's electrical and electronic architecture and the zone controller 200 is configured to manage and control a specific area of the vehicle.

The vehicle area controlled by the zone controller 200 has at least one vehicle equipment that communicates with the zone controller 200. The zone controller 200 can determine the zone information of the vehicle area based on the equipment information received from the vehicle equipment, such as the status information of the light switch, the video captured by the vehicle camera, etc. That is, the zone information can be the vehicle body data of the vehicle area controlled by the zone controller 200. The vehicle body data can comprise, but is not limited to, the equipment information of the vehicle equipment communicating with the zone controller 200 or the vehicle control information, such as the control information of the lamp switch, the control information of the door lock, etc.

The vehicle equipment can comprise on-board sensors, display devices, etc., but is not limited to these.

Figure 2:
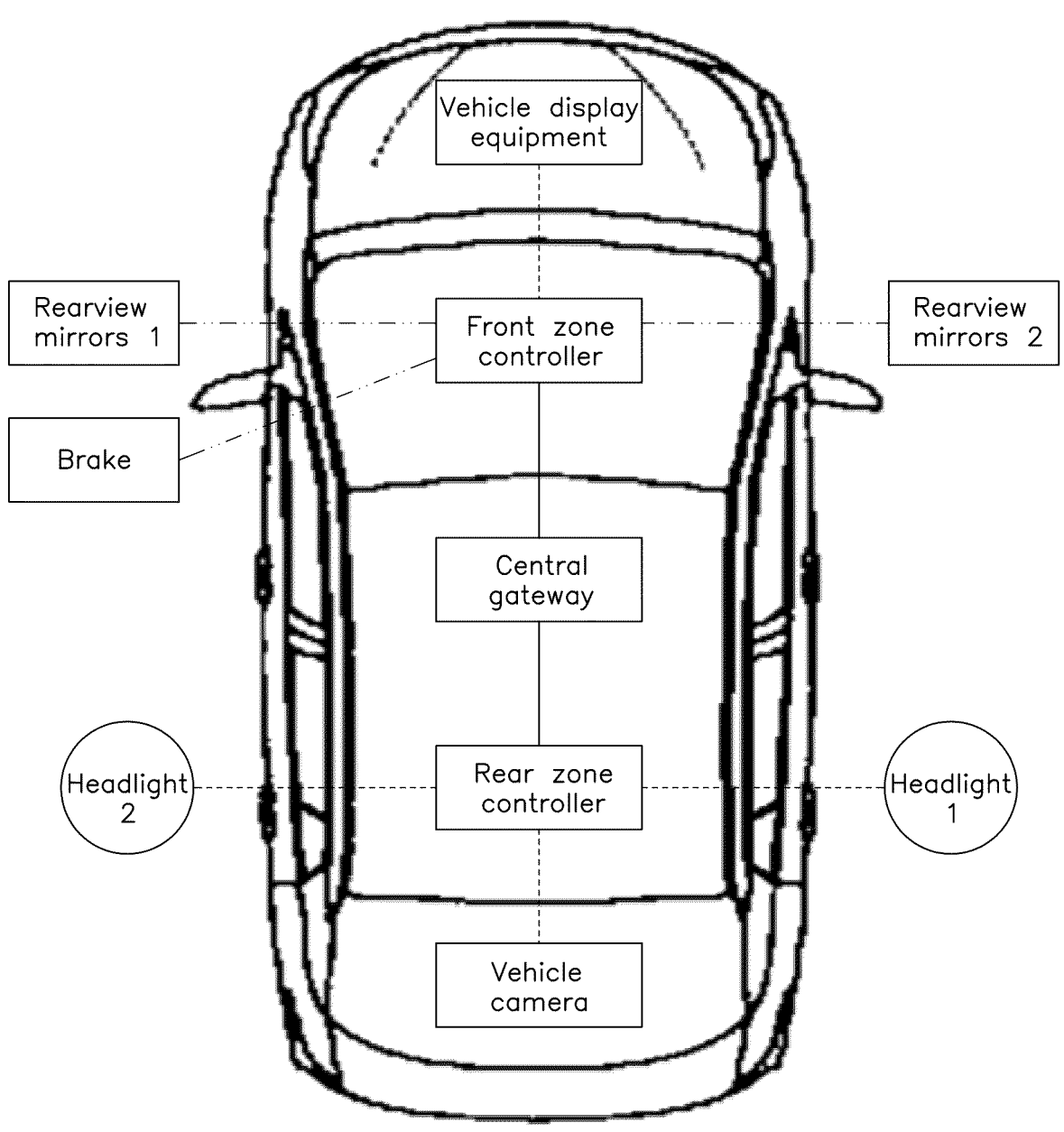
FIG. 2 is a block diagram of a vehicle communication system in one embodiment of the present application.

As shown in FIG. 2, the zone controller 200 can comprise a front zone controller and a rear zone controller, but is not limited to this. In practical applications, the vehicle can set more or less zone controller 200.

The front zone controller located at the front of the vehicle can communicate with the vehicle equipment located at the head of the vehicle, such as the front cockpit, rearview mirrors, brakes, and vehicle display equipment. The rear zone controller located at the rear of the vehicle can communicate with the vehicle equipment located at the rear of the vehicle, such as headlights and rear cameras. Among them, the front zone controller can communicate with the vehicle display device based on the Flat Panel Display Link (FPD-LINK) to achieve efficient transmission of image data. In addition to communicating with the vehicle equipment shown in FIG. 1, the zone controller 200 can also communicate with more or fewer vehicle equipment depending on the actual application requirements.

Figure 3:
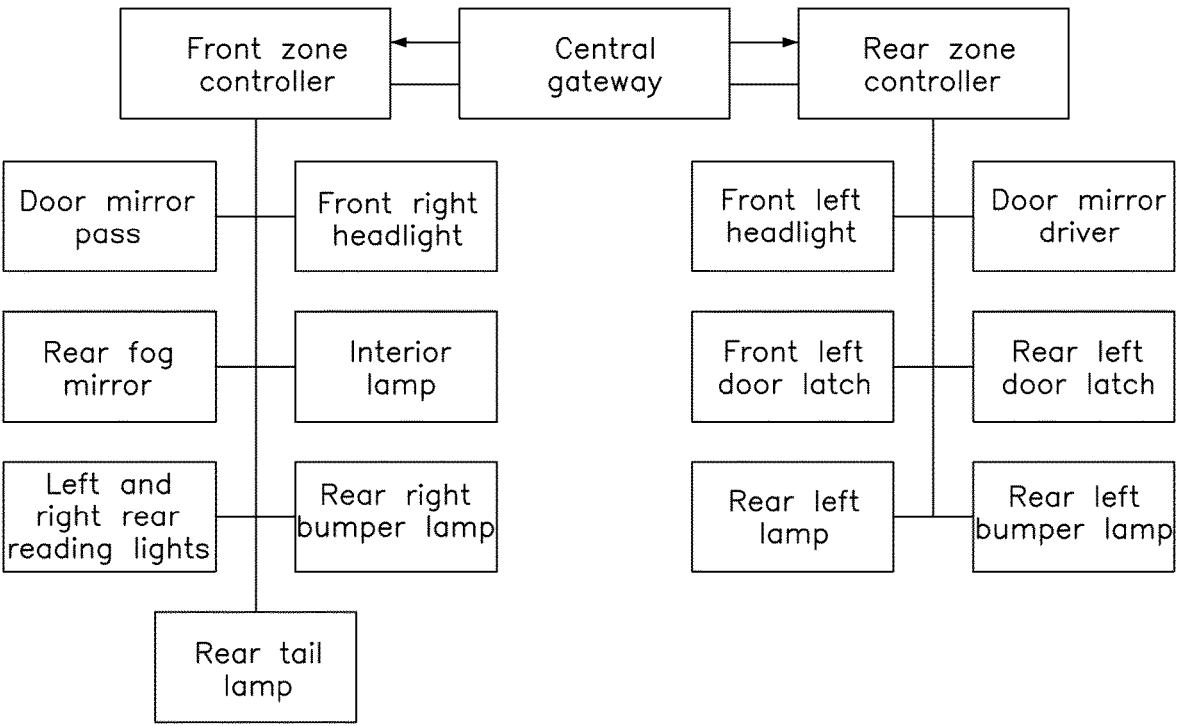
FIG. 3 is a structure diagram of the vehicle communication system according to an embodiment of the present disclosure.

As shown in FIG. 3, the front zone controller also connects to a door mirror pass, a front right headlight, a rear fog mirror, an interior lamp, and left and right rear reading lights, a rear right bumper lamp, a rear tail lamp and other communication connections.

The vehicle equipment can transmit the equipment information to the zone controller 200 (i.e. the source zone controller 210) connected to the vehicle equipment.

In one embodiment, the image data captured by the rear camera can be transmitted to the rear zone controller, in which case the rear zone controller is the source zone controller 210. The source zone controller 210 takes the image data as the zone information, and then transmits the image data to the central gateway 100 based on the time-sensitive network.

For example, the image data captured by the rear camera is transmitted to the rear zone controller 200, in which case the rear zone controller 200 is the source zone controller 210, which takes the image data as the zone information, and then transmits the image data to the central gateway based on the time-sensitive network. The central gateway is used to receive zone information from the source zone controller 210 based on time-sensitive network protocol.

The central gateway 100 is configured to receive the zone information from the source zone controller 210 based on the time-sensitive network protocol, determine information to be transmitted based on the zone information, determine a target zone controller 220 for receiving the information to be transmitted among the plurality of zone controllers 200 based on the zone information, and send the information to be transmitted to the target zone controller 220 based on the time-sensitive network protocol. The central gateway can execute a method for vehicle communication, as shown in FIG. 4. The method for vehicle communication can be applied to the central gateway 100 of the vehicle-mounted communication system 1000.

The central gateway 100 is a device capable of automatically performing numerical calculations and/or information processing in accordance with pre-programmed or stored instructions. Hardware of the central gateway 100 comprise but is not limited to processors, Microprogrammed Control Units (MCU), Application Specific Integrated Circuit (ASIC), Field-Programmable Gate Array (field-programmable gate Array), FPGA), Digital Signal Processor (DSP), embedded devices, etc.

FIG. 4 illustrates one exemplary embodiment of the method for vehicle communication. The flowchart presents an exemplary embodiment of the method. The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block S301.

In block S301, zone information from a source zone controller 210 of the plurality of zone controllers 200 is received based on the time-sensitive network protocol, and the zone information comprises vehicle body data of a vehicle area controlled by the source zone controller 210.

The vehicle area controlled by the source zone controller 210 has at least one vehicle equipment connected to the source zone controller 210, and the vehicle body data can comprise the equipment information of the vehicle equipment. For example the equipment information of the vehicle equipment can comprise the equipment status of the vehicle equipment, such as the door lock state, braking state, etc., and the external information received by the vehicle equipment, such as the image data captured by the vehicle camera.

The vehicle body data can further comprise vehicle control information, such as control signals to control the locking of the door.

In one embodiment, the source zone controller 210 is connected to the rear camera. The information in this area can comprise the image data taken by the rear camera, such as the astern image taken by the rear camera at the rear of the vehicle when reversing, or the rear road conditions taken by the rear camera when the vehicle is driving. If the source zone controller 210 is connected to the brakes, this zone information can comprise, but is not limited to, a brake signal.

The backbone network of the vehicle communication system 1000 is a time-sensitive network. The source zone controller 210 can transmit zone information to the central gateway 100 based on the time sensitive network protocol. In some embodiments, traffic transmission priority can be defined in a time-sensitive network protocol. The traffic transmission priority can represent the importance, delay, switch tolerance and jitter of the traffic.

The source zone controller 210 can be configured to obtain the traffic class of the zone information, and determine the traffic priority matching the traffic class of the zone information based on pre-stored correspondences between multiple traffic classes and multiple traffic transmission priorities. The information to be transmitted can be sent to the central gateway 100 based on the matched traffic priority.

In one embodiment, Table 1 shows the traffic transmission priority of different traffic classes (TCS).

TABLE 1

| traffic class | transmit type | importance | delay (ms) | switch tolerance | Jitter (ms) |
|---|---|---|---|---|---|
| TC8 | control signals or instructions related to safety, such as brake signals, throttle signals, etc | high | 1 | low | ±1 |
| TC5 | control signals or instructions unrelated to safety, such as seat control signal | medium | 100 100 | medium high | ±100 ±100 |
| TC4 | network control signals or management signals, such as network time synchronization signals | medium | 100 | low | ±100 |
| TC2 | streaming signals not related to safety | low low | 50 33 | medium medium | ±50 ±33 |
| TC1 | signals transmitted by best effort | low | 2000 | high | — |

Table 1 shows that the latency of the backbone network ranges from 1 ms to 200 ms, and the jitter ranges from ±1 ms to 100 ms. The backbone network using the above time-sensitive network has a transmission bandwidth of 100 Mbps to 1000 Mbps.

The traffic transmission priorities corresponding to each traffic class are only examples. In the actual application process, the traffic transmission priorities corresponding to different traffic class can be defined according to traffic transmission requirements.

The zone information transmitted by the source zone controller 210 to the central gateway 100 can comprise traffic class, and the zone controller 200 can transmit the zone information to the central gateway 100 according to the traffic transmission priority corresponding to the traffic class. The central gateway 100 can receive the zone information according to the traffic transmission priority.

By setting the backbone network of as TSN network, the backbone network can define different traffic transmission priorities based on different traffic categories, so that the latency and jitter of traffic transmission can meet the transmission requirements of different scenarios.

In block 302, the information to be transmitted is determined based on the zone information.

In one embodiment, if the zone information contains the communication address of a vehicle equipment, it indicates that the zone information is the zone information that needs to be sent to a vehicle equipment, and the zone information can be the information to be transmitted.

In addition to the zone information to be transmitted, the central gateway 100 can also integrate the vehicle control function, that is, the central gateway 100 can determine the vehicle control information based on zone information. For example, the zone information is brake signals, and the central gateway 100 can generate brake light signals based on the brake signals.

In other words, the information to be transmitted can also comprise vehicle control information, which is configured to control target vehicle equipment.

In block 303, a target zone controller 220 for receiving the information to be transmitted is determined among the plurality of zone controllers 200 based on the zone information.

In one embodiment, if the zone information comprises the communication address of a vehicle equipment, indicating that the zone information is the zone information that needs to be sent to a vehicle equipment, the zone controller 200 that communicates with the vehicle equipment can be regarded as the target zone controller 220.

The central gateway 100 can also generate vehicle control information based on zone information. In the case that the information to be transmitted is vehicle control information, the central gateway 100 can determine the target vehicle equipment controlled by the vehicle control information, and determine the zone controller 200 that controls the target vehicle equipment, and regard the zone controller 200 as the target zone controller 220. For example, in the case that the vehicle control information is the brake light signal, the zone controller 200 that controls the brake light is the target zone controller 220.

In block 304, the information to be transmitted is sent to the target zone controller based on the time-sensitive network protocol.

Referring to FIG. 5, in one embodiment, a method for sending information to be transmitted can comprise blocks S3041-S3043.

In block 3041, a traffic class of the information to be transmitted is obtained.

In one embodiment, if the information to be transmitted is zone information, the traffic category of the zone information can be the traffic category in the information to be transmitted. If the information to be transmitted is the vehicle control information generated by the central gateway 100, the central gateway 100 can determine the traffic category of the information to be transmitted based on the content of the vehicle control information.

In block 3042, a traffic transmission priority matching the traffic class of the information to be transmitted is determined based on pre-stored correspondences between multiple traffic classes and multiple traffic transmission priorities. In one embodiment, Table 1 shows the correspondence between the pre-stored traffic categories and traffic transmission priorities.

In block 3043, the information to be transmitted is sent to the target zone controller 220 based on the matched traffic transmission priority. The central gateway 100 can transmit the information to be transmitted according to the requirements for delay, switch tolerance, and jitter defined in the traffic transmission priority.

The backbone network can determine the traffic transmission priority according to different traffic class, so as to carry out traffic transmission, and thus meet the traffic transmission requirements of different scenarios.

Furthermore, the central gateway 100 can identify whether the information to be transmitted is vehicle control information. If the information to be transmitted comprises the vehicle control information, the central gateway 100 can send the vehicle control information to the target zone controller 220 based on Scalable service-Oriented MiddlewarE over Internet Protocol (SOME/IP) protocols and time-sensitive network protocols running on top of IP.

The some/ip protocols mainly provides application program interfaces for the application layer. In the communication based on some/ip protocol, the client, such as the central gateway 100, can subscribe to the service to the server message in SOME/IP-SD (SOME/IP Service Discovery) message format. Then the server, such as the source zone controller 210, publishes the notification message. The notification message can be zone information, such as the status of vehicle equipment such as doors, windows and lights. The client can generate vehicle control information based on zone information to control doors, windows and lights.

In other words, the backbone network of the vehicle communication system 1000 can also adopt SOME/IP protocols, that is, in the backbone network, the vehicle control information transmitted between the central gateway 100 and plurality of zone controllers 200 can be transmitted by SOME/IP protocols.

FIG. 1 shows data transmission process of the vehicle communication system 1000 in one embodiment.

1. If the front zone controller 200 receives sensor signals, the sensor signals can be transmitted to the rear zone controller through the central gateway 100 to control the actuator that communicates with the rear zone controller to respond to the sensor signals.

2. The central gateway 100 can transmit the vehicle control signals to the front zone controller 200 or the rear zone controller 200 through the backbone network to realize the vehicle control.

3. The rear camera transmits the image data to the rear zone controller in the backbone network. The image data then can be transmitted to the display via the backbone network, i.e. through the central gateway 100.

The backbone network of vehicle communication system 1000 adopts a central gateway 100 and is paired with plurality of zone controllers 200, which can form a flexible network topology. When configuring vehicle communication system 1000, the foot position of zone controller 200 and Software Component (SWC) can be adjusted to support the application requirements of a variety of vehicle models, and compared with the communication connection of each device to achieve data transmission, the backbone network can reduce the Low Voltage Differential Signaling (LVDS) special wiring harness and simplify the vehicle network.

Furthermore, the backbone network adopts the TSN network, which can improve the data transmission bandwidth, and can realize the transmission of vehicle control signals, image data, and high-flow 55-V2X streaming data inside the vehicle, thus making it convenient to integrate image data, high-precision map information, and lidar signals required in the process of automatic driving. The TSN can satisfy the control requirements of high reliability and low latency.

Figure 6:
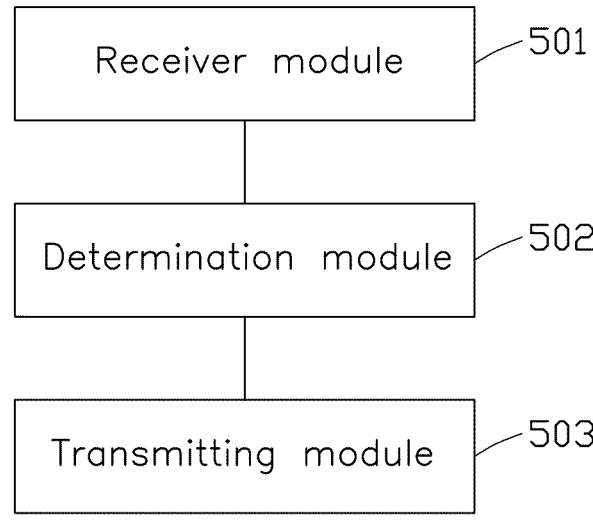
FIG. 6 is a structural diagram of a vehicle communication device according to another embodiment of the present disclosure.

FIG. 6 is a structural diagram of a vehicle communication device 1 according to an embodiment of the present disclosure.

The vehicle communication device 1 comprises a receiver module 501, a determination module 502 and a transmitting module 503. In one embodiment, the modules can be programmable software instructions stored in memory 20 that can be invoked and executed by a processor 30. It is understood that, in other embodiments, the above modules can also be program instructions or firmware solidified in the processor.

The receiver module 501 is configured to receive zone information from the source zone controller 210 in the plurality of zone controllers 200 based on the time sensitive network protocol. The zone information is the vehicle body data of the vehicle area controlled by the source zone controller 210.

The determination module 502 is configured to determine information to be transmitted based on the zone information, and determine a target zone controller 220 for receiving the information to be transmitted among the zone controllers 200 based on the area information.

The transmitting module 503 is configured to transmit the information to be transmitted to the target zone controller 220 based on the time-sensitive network protocols.

Figure 7:
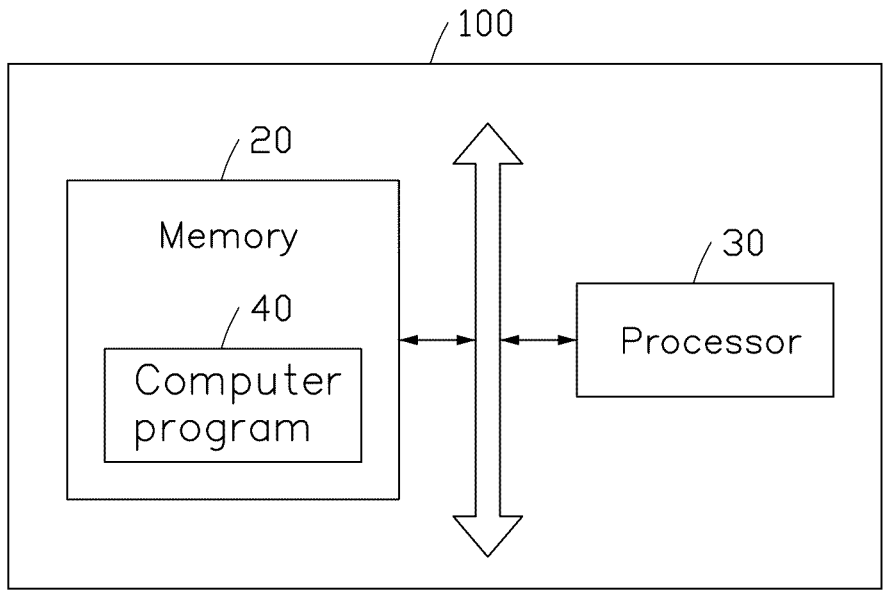
FIG. 7 is a structural diagram of a central gateway according to an embodiment of the present disclosure.

FIG. 7 is a structural diagram of a central gateway 100 according to an embodiment of the present disclosure.

The central gateway 100 comprises a memory 20, a processor 30, and computer programs 40 stored in the memory 20 and capable of running on the processor 30. The blocks in the above embodiments of the vehicle communication method, such as blocks 301 to 304 shown in FIG. 3, can be realized when processor 30 executes the computer programs 40.

In one embodiment, the computer programs 40 can be divided into one or more modules/units stored in the memory 20 and executed by the processor 30. The one or more modules/units can be a series of computer program instruction segments capable of fulfilling a specific function, and the instruction segments are configured to describe the execution process of the computer programs 40 in the central gateway 100. For example, the computer programs 40 can be divided into the receiver module 501, the determination module 502, and the transmitting module 503 as shown in FIG. 6.

The central gateway 100 in the diagrams does not constitute a limitation of the central gateway 100. The central gateway 100 can comprise more or fewer components than the diagram, or a combination of certain components, or different components. For example, the central gateway 100 can also comprise input and output devices, network access devices, buses, etc.

The processor 30 can be a Central Processing Unit (CPU), or other general-purpose processor, or Digital Signal Processor (DSP), Application Specific Integrated Circuit (ASIC), off-the-shelf Programmable Gate Array, Field-Programmable Gate Array (FPGA), or other programmable logic devices, discrete gate or transistor logic devices, discrete hardware components, etc. The general purpose processor can be a microprocessor, a single chip computer or a processor or any conventional processor.

The memory 20 can be configured to store the computer programs 40 and/or modules/units, and processor 30 implements various functions of the central gateway 100 by running or executing computer programs and/or modules/units stored in the memory 20 and by invoking data stored in the memory 20. The memory 20 can mainly consist of a stored program area and a stored data area, wherein the stored program area can store the operating system and the application programs required for at least one function (such as sound playback function, image playback function, etc.). The storage data area can store data (such as audio data) created according to the operation of the central gateway 100. In addition, the memory 20 can comprise high speed random access memory, and can also comprise non-volatile memory, such as hard disks, memory, plug-in hard disks, Smart Media cards (SMC), Secure Digital (SD) cards, and more. Flash Card, at least one disk memory pieces, flash memory device, or other non-volatile solid state memory pieces.

The integrated modules/units of the central gateway 100 can be stored in a computer readable storage medium if implemented in the form of software functional units and marketed or used as stand-alone products. Based on this understanding, the application realizes all or part of the process in the above embodiments method can also be accomplished by instructs the related hardware through computer programs 40. Th computer programs 40 can be stored in the computer readable storage medium. The computer programs 40, when executed by a processor 30, can realize the blocks of the above embodiments. The computer programs 40 comprise the computer program code. The computer program code can be source code form, object code form, executable file or some intermediate form. The computer readable media can comprises any entity or device capable of carrying the computer program code, recording medium, USB flash drive, portable hard drive, magnetic disk, optical disc, computer Memory 20, read-only memory 20 (ROM), random access memory 20 (RAM), electric carrier signal, telecommunication signal and software distribution medium, etc. It should be noted that the contents of the computer readable media can be appropriately increased or decreased according to the requirements of the legislation and patent practice in the jurisdiction, for example, in some jurisdictions, according to the legislation and patent practice, the computer readable media does not comprise electric carrier signals and telecommunications signals.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for vehicle communication comprising:
   providing a time-sensitive network to a vehicle communication system;

providing a central gateway communicating, through the time-sensitive network, with a plurality of zone controllers of the vehicle communication system;

transmitting, from a source zone controller of the plurality of zone controllers, zone information comprising vehicle body data of a vehicle area controlled by the source zone controller;

receiving the zone information from the source zone controller based on a protocol of the time-sensitive network;

determining information to be transmitted based on the received zone information;

determining a target zone controller among the plurality of zone controllers, for receiving the information to be transmitted based on the received zone information; and sending the information to be transmitted to the target zone controller based on the protocol of the time-sensitive network protocol;

providing the protocol to the time-sensitive network, the protocol comprising a traffic transmission priority, and sending the information to be transmitted to the target zone controller based on the protocol of the time-sensitive network protocol comprising:

obtaining a traffic class of the information to be transmitted;

determining a traffic transmission priority that matches the obtained traffic class based on pre-stored correspondences of traffic classes and traffic transmission priorities; and sending the information to be transmitted to the target zone controller based on the determined traffic transmission priority;

wherein determining the target zone controller among the plurality of zone controllers, for receiving the information to be transmitted based on the received zone information, comprises:

in response that the received zone information comprises a communication address of a vehicle equipment, determining a corresponding zone controller communicating with the vehicle equipment to be the target zone controller.

2. The method for vehicle communication of claim 1, wherein the information to be transmitted comprises vehicle control information, wherein the vehicle control information is configured to control a target vehicle equipment, the target vehicle equipment is located in a vehicle area controlled by the target zone controller.

3. The method for vehicle communication of claim 2, wherein sending the information to be transmitted to the target zone controller based on the protocol of the time-sensitive network comprises:

sending the vehicle control information to the target zone controller based on a some/ip protocol and the protocol of the time-sensitive network protocol.

4. The method for vehicle communication of claim 1, wherein determining information to be transmitted based on the received zone information comprises:

if the zone information is identified as image data from a rear camera of a vehicle, determining the image data as the information to be transmitted.

5. A vehicle communication system, comprising a central gateway and a plurality of zone controllers, wherein a backbone network of the vehicle communication system is a time-sensitive network, the central gateway communicates with the plurality of zone controllers through the time-sensitive network, a source zone controller among the plurality of zone controllers is configured to obtain zone information and send the zone information to the central gateway based on a protocol of the time-sensitive network, the zone information comprises vehicle body data of a vehicle area controlled by the source zone controller, the central gateway is further configured to:

receive the zone information from the source zone controller based on the protocol of the time-sensitive network, determine information to be transmitted based on the zone information, determine a target zone controller among the plurality of zone controllers, for receiving the information to be transmitted based on the zone information, and send the information to be transmitted to the target zone controller based on the protocol of the time-sensitive network;

wherein determine the target zone controller among the plurality of zone controllers, for receiving the information to be transmitted based on the received zone information, comprises:

in response that the received zone information comprises a communication address of a vehicle equipment, determine a corresponding zone controller communicating with the vehicle equipment to be the target zone controller;

wherein the protocol comprises a traffic transmission priority, the central gateway is further configured to determine a traffic class of the information to be transmitted, determine the traffic transmission priority that matches the traffic class of the information to be transmitted based on pre-stored correspondences between traffic classes and traffic transmission priorities, and send the information to be transmitted to the target zone controller based on the traffic transmission priority that is determined matching with the traffic class of the information to be transmitted.

6. The vehicle communication system of claim 5, wherein the protocol comprises a traffic transmission priority, the source zone controller is further configured to obtain a traffic class of the information to be transmitted, determine the traffic transmission priority that matches the traffic class of the information to be transmitted based on pre-stored correspondences between traffic classes and traffic transmission priorities, and send the information to be transmitted to the target zone controller based on the traffic transmission priority that is determined matching the traffic class of the information to be transmitted.

7. A central gateway comprising:

at least one processor; and a non-transient data storage storing one or more programs which when executed by the at least one processor, cause the at least one processor to:

providing a time-sensitive network to a vehicle communication system;

providing a central gateway communicating, through the time-sensitive network, with a plurality of zone controllers of the vehicle communication system;

transmitting, from a source zone controller of the plurality of zone controllers, zone information comprising vehicle body data of a vehicle area controlled by the source zone controller;

receive the zone information from the source zone controller based on the protocol of the time-sensitive network, determine information to be transmitted based on the zone information, determine a target zone controller among the plurality of zone controllers, for receiving the information to be transmitted based on the zone information, and send the information to be transmitted to the target zone controller based on the protocol of the time-sensitive network;

wherein the protocol comprises a traffic transmission priority, and sending the information to be transmitted to the target zone controller based on the time-sensitive network protocol comprises:

obtaining a traffic class of the information to be transmitted;

determining a traffic transmission priority that matches the obtained traffic class based on pre-stored correspondences of traffic classes and traffic transmission priorities;

sending the information to be transmitted to the target zone controller based on the determined traffic transmission priority;

wherein determine the target zone controller among the plurality of zone controllers, for receiving the information to be transmitted based on the received zone information, comprises:

in response that the received zone information comprises a communication address of a vehicle equipment, determine a corresponding zone controller communicating with the vehicle equipment to be the target zone controller.

8. The central gateway of claim 7, wherein the information to be transmitted comprises vehicle control information, the vehicle control information is configured to control a target vehicle equipment, the target vehicle equipment is located in a vehicle area controlled by the target zone controller.

9. The central gateway of claim 8, wherein sending the information to be transmitted to the target zone controller based on the time-sensitive network protocol comprises:

sending the vehicle control information to the target zone controller based on a some/ip protocol and the protocol of time-sensitive network.

10. The central gateway of claim 7, wherein determining information to be transmitted based on the received zone information comprises:

if the zone information is identified as image data from a rear camera of a vehicle, determining the image data as the information to be transmitted.

* * * * *